Patented June 6, 1950

2,510,808

UNITED STATES PATENT OFFICE 2,510,808

PLASTICIZING ISOBUTYLENE-DIOLEFIN RUBBER

Per K. Frolich, Westfield, N. J., assignor to Standard Oil Development Company, a corporation of Delaware No Drawing. Application March 21, 1945,
Serial No. 584,029

11 Claims. (Cl. 260—39.8)

This invention relates to synthetic polymers; relates particularly to curable synthetic polymers of rubbery character; and relates especially to means for adjusting the molecular weight and plasticity of rubbery polymers for maximum ease of processing.

It has been found possible in the prior art to prepare a variety of polymers, especially a polymer of isobutylene with a polyolefin such as butadiene or isoprene or the like, all of which are rubbery in character, with most of the physical properties of caoutchouc including curability with sulfur, an elongation ranging from 250% to 1200% under tension at break, forcible retraction upon release of tension to approximately original size and shape, and tensile strengths at break ranging from 500 lbs. to 4000 lbs. per square inch.

However, these polymers as prepared, especially if the molecular weight, or Staudinger number, is above about 70,000, are extremely difficult to mill and process, because of the low fluidity and high elasticity. Accordingly, it is desirable that various batches be brought into condition for optimum ease of processing.

According to the present invention, the polymer may be prepared at any convenient molecular weight with a Mooney viscosity ranging from 60 to 100 or above. The resulting polymer is then treated with an aliphatic mercaptan and milled at an elevated temperature until the viscosity has reached the desired value.

Thus the invention provides means for reducing the Mooney viscosity of a synthetic rubbery polymer to a convenient or desired value for maximum ease of milling and processing. Other objects and details of the invention will be apparent from the following description:

The preferred raw material of the present invention is a linear copolymer prepared at low temperature from an isoolefin containing less than seven carbon atoms and any convenient polyolefin or multiolefin; the preferred isoolefin being isobutylene. For the copolymerizate, such diolefins as butadiene or isoprene or piperylene or dimethylbutadiene or myrcene or dimethallyl or the like may be used; substantially any of the higher unsaturates having from 4 to 12 or 14 carbon atoms per molecule being usable, without regard to the molecular configuration or the presence of substituents.

The reaction is desirably conducted at temperatures within the range between about 0° C. and —164° C., the preferred range being between —50° C. and —103° C. For this purpose the olefinic mixture may be cooled by a refrigerating jacket upon the reactor, any convenient or desired refrigerant being readily usable. Alternatively, an internal refrigerant may be used, admixed directly with the olefinic polymerizate. For this purpose, such materials as normal propane giving a temperature of approximately —40° C. may be used, or solid carbon dioxide giving —78° C., or liquid ethane giving —88° C., or liquid ethylene giving —103° C., or even liquid methane giving —164° C., or mixtures of these various refrigerants may be used, as well as others which will be obvious to those skilled in the art. These materials serve as diluent-refrigerants. Other diluents may also be used, either with the refrigerating jacket or the internal refrigerant; such substances as ethyl or methyl chloride or carbon disulfide or the lower boiling petroleum hydrocarbons such as butane, pentane, hexane, and the like may be used. The number of diluents is, however, limited to those substances which do not interfere with the polymerization reaction, either by destroying the catalyst or entering in an undesirable polymerization reaction.

The polymerization catalysts depends to some extent upon the character of the diolefin used, butadiene particularly requiring an especially powerful polymerization catalyst. However, the polymerization catalyst preferably is a Friedel-Crafts metal halide in solution in low-freezing non-complex-forming solvent. The Friedel-Crafts metal halide catalysts may be any of the catalysts disclosed by N. O. Calloway in his article on "The Friedel-Crafts synthesis," printed in the issue of "Chemical Reviews," published for the American Chemical Society at Baltimore in 1935 in volume XVII, No. 3, beginning on page 327; the list being particularly well shown on page 375.

For the low-freezing non-complex forming solvent, any solvent which will dissolve a perceptible amount of the Friedel-Crafts metal halide without the formation of a complex, and is liquid at a temperature at or above the polymerization temperature, is usable. By "low-freezing" in this definition there is meant a solvent having a freezing point below 0° C., and by "non-complex-forming" there is meant a solvent which evaporates away from the Friedel-Crafts metal halide completely, with a minor or negligible elevation in temperature over the boiling point of the pure solvent (an elevation of boiling point of 1 or 2 degrees is the probable maximum). The preferred low-boiling, non-complex-forming catalyst solvents are such substances as ethyl or methyl chloride or carbon disulfide, or with the mixed halide catalysts, various of the saturated hydrocarbons such as ethylene, propane, ethane, butane, pentane, and the like.

The polymerization reaction is conveniently conducted by the addition of the catalyst to the vigorously stirred, cold, reaction mixture.

The reaction proceeds rapidly, usually substantially instantaneously, to yield a solid polymer which may have a molecular weight as determined by the Standinger method ranging from 25,000 or 30,000 up to 150,000 or occasionally as high as 200,000. With fresh active catalyst, pure olefinic materials, especially with isobutylenes having a purity of 98% or higher and an olefin having a purity of 96% or higher, and a reaction temperature in the neighborhood of −103, the Staudinger molecular weight tends to be in the neighborhood of from 60,000 to 80,000 or 85,000 with an iodine number usually ranging between 1 and 10, although occasionally with high diolefin proportions, the iodine number may be as high as 40 or 50.

The polymer is removed from the cold mixture by any convenient process and brought up to room temperature. It is then milled on the open roll mill and washed with water during the milling operation to remove as much as possible of the catalyst and as much as possible of the unreacted olefins and diluent or refrigerant and the like. It is compounded, formed in the desired shape and cured at an elevated temperature for an appropriate time.

For the preparation of such structural elements as automobile inner tubes, automobile tires, proofed goods, mechanical goods, and the like, a considerable amount of milling, calendering, and extruding is necessary, and it is found that polymers having Mooney viscosity values between 35 and 60, preferably between 40 and 50 are best suited for such operations. However, the polymer as received from the reactor tends to show Mooney viscosity values ranging from 60 up to considerably higher numbers, and polymer samples having such viscosity values are found to be extremely difficult to mill, calender, and extrude because of the high "nerve" and low plasticity. They do not "band" readily on the mill, "swell" badly from the extruder, and do not flow into the interstices of the fabric during calendering.

According to the present invention, the polymer, after warming to room temperature and washing, is milled, and compounded with a small amount of an aliphatic mercaptan, the preferred amount being from 0.1% to 1% per 100% of polymer, although amounts as small as 0.001% are helpful in some instances, and amounts as great as 3% to 5% may be used in other instances. The desired amount of mercaptan is adjusted according to the amount of reduction in Mooney viscosity value desired, and the polymer is then milled on the double roll mill at temperatures between 200° F. and 350° F. until the desired plasticity is reached, whereupon the final compounding of the polymer with other materials may be conducted and the polymer then transferred to the calender or the extruder; processed thereon and then cured.

Determinations so far made indicate that any aliphatic or alkyl mercaptan is usable, ranging from methyl mercaptan up to those of the highest obtainable molecular weights. However, the preferred mercaptans are those having boiling points above about 135° C. since it is desirable to avoid volatilization of the mercaptan from the rubber material during the working step which serves to soften the material. The preferred substances are the diisobutyl (isooctyl) mercaptans or the triisobutyl (isododecyl) mercaptans or the lauryl mercaptans or the tertiary octyl mercaptans or the like; the preferred carbon number ranged for the alkyl group being from 6 to about 20 carbon atoms. Mercaptans having much higher carbon atoms numbers are usable although they are not as desirable because of the commercial unavailability of them and the tendency to be more or less heavy oils to semisolid or solid products which are more difficult to mill into the rubber compound.

This plasticization process and the use of these aliphatic mercaptans is not alone applicable to the low-temperature interpolymer of isobutylene with a diolefin, but is, broadly, applicable to any rubber-like substances, including caoutchouc, or the emulsion interpolymer of butadiene (or isoprene, or piperylene, or dimethyl butadiene) with a styrene; or the emulsion interpolymer of butadiene (or isoprene or piperylene or dimethyl butadiene or the like) with acrylonitrile, or the emulsion polymer of chloroprene.

Thus the raw material of the present invention is any rubber-like body which is characterized by solidity and a relatively high elongation at break ranging from 250% to 1200% of its unstressed length; a tensile strength at break ranging from 500 to 4500 lbs. per square inch and, broadly, the property of forcible retraction to approximately original size and shape upon the release of previously applied tractive forces; and the essence of the invention is the plasticization of such a "rubbery" material by milling or pressure working the "rubbery" material in the presence of an aliphatic mercaptan; preferably a mercaptan having a boiling point about 300° F.; at temperatures within the range between 200 and 350° F.

EXAMPLE 1

A polymer was prepared from a mixture containing a major proportion, namely, 97.5 parts by weight of isobutylene with a minor proportion, namely, 2.5 parts by weight of isoprene; the isobutylene having a purity of 98% and the isoprene, a purity of 96%. This mixture was diluted with approximately 200% by weight of liquid methyl chloride and cooled to a temperature of −103° C. by a refrigerating jacket upon the reactor. To this mixture there was then added approximately 100 parts by weight of a solution of aluminum chloride in methyl chloride; the solution containing approximately 0.6% of aluminum chloride. The resulting solid polymer, consisting of approximately 60% of the mixed olefinic material was separated from the reaction mixture by treating the whole polymerization mixture with warm water. The resulting polymer was found to have a Staudinger number of approximately 75,000, an iodine number of 1½, and a Mooney viscosity of approximately 85 and was much too "nervy" for satisfactory compounding or processing.

The warm polymer was placed on the double roll mill and washed with water for approximately fifteen minutes. To the washed polymer there was then added approximately 0.5% of triisobutyl mercaptan $C_{12}H_{25}SH$. The mercaptan was added in small quantities, as fast as it was absorbed by the polymer, and the milling was continued at a temperature of approximately 237°

F. until the viscosity was brought down to the point where it handled well on the mill and determinations showed a Mooney viscosity within the range between 40 and 50.

The polymer was then compounded according to the following recipe:

| | Parts by weight |
|---|---|
| Softened copolymer | 100 |
| Stearic acid | 5 |
| Zinc oxide | 5 |
| Carbon black | 10 |
| Sulphur | 3 |
| Tuads (tetramethyl thiuram disulfide) | 1 |

The resulting compound was then extruded in the form of a tube and found to yield an excellent tube of good properties. Another portion was put on the calender and found to pass readily into the interstices of the fabric. Still another portion was extruded in the form of a tire tread and was found to be readily attachable to a tire carcass. All of these structures were then cured by heating under appropriate conditions to a temperature of approximately 307° F. for a time interval of approximately twenty minutes. The resulting polymer was found to have a tensile strength of approximately 2600 lbs. and a elongation at break of approximately 1200%.

EXAMPLE 2

The effectiveness of triisobutyl mercaptan as a plasticizing agent, as shown in Example 1, was verified by a series of tests using triisobutyl mercaptan diluted with a moderately high-boiling hydrocarbon solvent having a boiling range between approximately 325° F. and 375° F. (marketed as Varsol No. 1); approximately 5¼ parts of triisobutyl mercaptan being diluted with approximately 14¾ parts of the hydrocarbon solvent. A sample of the low-temperature interpolymer of isobutylene with isoprene, prepared as above described, using 97.5 parts of isobutylene with 2.5 parts of isoprene was used as the rubber to be plasticized.

The material showed Mooney viscosity values at 212° F. as shown in the subjoined Table I.

Four portions of this rubber stock were taken, one portion serving as a control, the other portions being milled at 237° F. for an appropriate length of time with 0.4%, 0.8% and 1.2% of diluted triisobutyl mercaptan as above described.

The four portions were then compounded according to the following recipe:

| | Parts by weight |
|---|---|
| Polymer | 100 |
| Plasticizer | As noted |
| Zinc oxide | 5 |
| Stearic acid | 3 |
| Easy processing channel black | 50 |
| Tetramethyl thiuram disulfide | 1 |
| Mercaptobenzothiazole | 0.5 |
| Sulfur | 2 |

Each portion was then divided into five parts which were cured at 307° F. for time intervals of 10, 20, 40, 60 and 80 minutes. Test samples were then cut from the cured specimens and tested for tensile strength; modulus at 300% elongation; and elongation at break. These values for the four portions are set out in the subjoined Table I as indicated.

Still other portions were cured for 75 minutes at 307° F. and tested for rebound at 40° C. and 100° C.; the rebounding values also being shown in the subjoined table.

Values for the Goodrich Flexometer test are also shown in the subjoined table; including Shore hardness values; static compression values; initial dynamic compression values; dynamic drift; temperature rises; and percent set. The subjoined Table I also shows values for the De Mattia Flexometer determinations.

The parts of plasticizer shown in the tables are parts of the mixture of mercaptan and oil, not mercaptan alone.

Table I

| Stock No. | 1 | 2 | 3 | 4 |
|---|---|---|---|---|
| Polymer | 100 | 100 | 100 | 100 |
| Triisobutyl mercaptan, 5.24 pts | | 0.4 | 0.8 | 1.2 |
| Hydrocarbon diluent, 14.76 pts | | | | |
| Mooney Viscosity @ 212° F.: | | | | |
| 1½′ | 80 | 63 | 46 | 42 |
| 4′ | 75 | 59 | 43 | 40 |
| Tensile—Modulus @ 300%—Elongation: | | | | |
| 10′ @ 307° F | 2550-190-940 | 2350-170-1000 | 1630-150-960 | 1540-170-940 |
| 20′ | 2830-360-840 | 2780-330-870 | 2460-280-910 | 2470-280-880 |
| 40′ | 2840-550-750 | 2780-460-820 | 2680-440-830 | 2660-430-830 |
| 60′ | 2790-610-720 | 2700-530-740 | 2680-530-790 | 2700-530-790 |
| 80′ | 2750-650-690 | 2720-640-730 | 2680-570-760 | 2710-560-760 |
| Rebound @ 40°-100° C., 75′ @ 307° F | 36.1-54.8 | 36.1-53.4 | 36.7-51.2 | 35.5-51.2 |
| Goodrich Flexometer (0.125″ stroke, 148 lbs./sq. in., 40° C.) 75′ @ 307° F.: | | | | |
| Shore | 55 | 55 | 52 | 47 |
| Static Compression | 0.276 | 0.262 | 0.317 | 0.300 |
| Init. Dyn. Comp | 0.245 | 0.245 | 0.270 | 0.272 |
| Dynamic Drift | 0.043 | 0.051 | 0.064 | 0.086 |
| Temp. Rise | 32 | 28.5 | 37.5 | 36.5 |
| Per Cent Set | 5.1 | 5.0 | 8.9 | 9.6 |
| De Mattia Flex. (Ave. of 3 cut specimens), 75′ @ 307° F | 197,808 | 310,606 | 443,972 | 622,042 |

It may be noted that the polymer was hot masticated in the presence of the mercaptan at temperatures above 200° F. until the desired reduction in viscosity was obtained.

The values in this table show the effectiveness of the plasticization by triisobutyl mercaptans and the lack of harm to any of the important values such as tensile strength, modulus, or elongation at break; in fact, many of these values are substantially increased. The Shore hardness is reduced and the static compression modified without harm to other valuable properties; and the De Mattia Flexometer values are very greatly raised.

EXAMPLE 3

Similar determinations are made using a dilute diisobutyl mercaptan solution in the hydrocarbon solvent described in Example 2; 3.88 parts of diisobutyl mercaptan being diluted with 16.12 parts of said hydrocarbon diluent. Similar portions of polymer were separately treated with similar portions of the diluted mercaptan as indicated in the subjoined Table II. The resulting material was compounded and cured as in Example 2 and similar physical evaluations made to yield the subjoined Table II.

The parts of plasticizer shown in the tables are parts of the mixture of mercaptan and oil, not mercaptan alone.

These values show the effectiveness of more dilute triisobutyl mercaptans.

EXAMPLE 4

Similar determinations were made using diluted lauryl mercaptan and similar results were obtained as shown in subjoined Table III:

*Table III*

| Stock No | 1 | 2 | 3 | 4 |
|---|---|---|---|---|
| Polymer | 100 | 100 | 100 | 100 |
| Lauryl Mercaptan, 4 parts | | 0.4 | 0.8 | 1.2 |
| Hydrocarbon diluent, 16 parts | | | | |
| Mooney viscosity @ 212° F.: | | | | |
| 1½′ | 73 | 65 | 54 | 45 |
| 4′ | 68 | 60 | 49 | 41 |
| Tensile—Modulus @ 300%—Elongation: | | | | |
| 10′ @ 307° F | 2550-180-970 | 2520-170-990 | 2380-180-940 | 2100-140-1020 |
| 20′ | 2760-290-850 | 2920-310-850 | 2770-280-850 | 2630-250-890 |
| 40′ | 2810-460-760 | 2950-490-750 | 2880-490-780 | 2810-420-760 |
| 60′ | 2990-560-710 | 2910-560-720 | 2840-570-740 | 2830-510-750 |
| 80′ | 2900-580-710 | 2930-660-690 | 2820-650-700 | 2890-600-720 |
| Rebound @ 40°–100° C., 75′ @ 307° F | 39.1-56.4 | 38.5-57.1 | 37.9-52.7 | 38.5-54.8 |
| Goodrich Flexometer (0.125″ stroke, 148 lbs./sq. in., 40° C.) 75′ @ 307° F.: | | | | |
| Shore | 52 | 44 | 47 | 46 |
| Static Compression | 0.265 | 0.270 | 0.296 | 0.320 |
| Initial Dyn. Comp | 0.235 | 0.232 | 0.255 | 0.276 |
| Dynamic Drift | 0.038 | 0.039 | 0.045 | 0.052 |
| Temp. Rise | 25.0 | 25.0 | 28.5 | 30.0 |
| Per cent Set | 3.7 | 4.7 | 5.2 | 6.8 |
| De Mattia Flex. (Ave. of 3 cut specimens) 75′ @ 307° F | 596,959 | 455,741 | 817,122 | >1,000,000 |

In this instance the polymer was compounded by the recipe of Example 2.

EXAMPLE 5

Diluted crude tertiary octyl mercaptan was

*Table II*

| Stock No | 1 | 2 | 3 | 4 |
|---|---|---|---|---|
| Polymer | 100 | 100 | 100 | 100 |
| Diisobutyl mercaptan, 3.88 parts | | 0.4 | 0.8 | 1.2 |
| Hydrocarbon diluent, 16.12 parts | | | | |
| Mooney Viscosity at 212° F.: | | | | |
| 1½′ | 80 | 68 | 57 | 50 |
| 4′ | 75 | 62 | 53 | 47 |
| Tensile—Modulus at 300%—Elongation: | | | | |
| 10′ at 307° F | 2550-190-940 | 2270-180-970 | 2070-230-950 | 1930-150-1040 |
| 20′ | 2830-360-840 | 2740-290-880 | 2500-290-870 | 2580-270-930 |
| 40′ | 2840-550-750 | 2850-530-840 | 2850-490-770 | 2770-450-840 |
| 60′ | 2790-610-720 | 2810-560-740 | 2760-520-770 | 2760-520-770 |
| 80′ | 2750-650-690 | 2780-640-760 | 2740-540-770 | 2680-570-730 |
| Rebound at 40°–100° C., 75′ at 307° F | 36.1-54.8 | 36.7-54.1 | 35.5-52.7 | 35.5-54.1 |
| Goodrich Flexometer (0.125″ stroke, 148 lbs./sq. in., 40° C.) 75′ at 307° F.: | | | | |
| Shore | 55 | 55 | 58 | 51 |
| Static Compression | 0.276 | 0.266 | 0.288 | 0.306 |
| Initial Dyn. Comp | 0.245 | 0.251 | 0.245 | 0.273 |
| Dynamic Drift | 0.043 | 0.060 | 0.053 | 0.068 |
| Temp. Rise | 32 | 34 | 38 | 32 |
| Per cent Set | 5.1 | 5.5 | 5.2 | 7.0 |
| De Mattia Flex. (Ave. of 3 cut specimens) 75′ at 307° F | 197,808 | 678,193 | 301,463 | 771,500 |

It may be noted that the polymer was hot masticated in the presence of the mercaptan at temperatures above 200° F. until the desired reduction in viscosity was obtained.

used as a plasticizer, as in Example 2 and similar inspection data were obtained as shown in the subjoined Table IV:

*Table IV*

| Stock No | 1 | 2 | 3 | 4 |
|---|---|---|---|---|
| Polymer | 100 | 100 | 100 | 100 |
| Crude t-octyl Mercaptan, 3.88 pts | | 0.4 | 0.8 | 1.2 |
| Hydrocarbon diluent, 16.12 pts | | | | |
| Mooney Viscosity @ 212° F.: | | | | |
| 1½′ | 74 | 66 | 51 | 47 |
| 4′ | 68 | 60 | 47 | 44 |
| Tensile—Modulus @ 300%—Elongation: | | | | |
| 10′ @ 307° F | 2580-260-860 | 2590-230-960 | 2540-250-950 | 1520-220-800 |
| 20′ | 2850-390-850 | 2830-350-890 | 2550-310-850 | 2570-320-890 |
| 40′ | 2730-510-720 | 2830-540-790 | 2830-510-790 | 2690-510-840 |
| 60′ | 2740-600-740 | 2860-540-790 | 2760-610-760 | 2670-580-780 |
| 80′ | 2820-630-730 | 2810-580-740 | 2730-640-740 | 2700-620-760 |
| Rebound @ 40°–100° C., 75′ @ 307° F | 41.1-58.6 | 41.1-58.6 | 40.8-56.4 | 39.8-54.1 |
| Goodrich Flexometer (0.125″ stroke, 148 lbs./sq. in., 40° C.) 75′ @ 307° F.: | | | | |
| Shore | 52 | 47 | 52 | 49 |
| Static Compression | 0.276 | 0.257 | 0.286 | 0.267 |
| Initial Dyn. Comp | 0.251 | 0.233 | 0.275 | 0.255 |
| Dynamic Drift | 0.056 | 0.055 | 0.072 | 0.090 |
| Temp. Rise | 28.5 | 26.0 | 33.0 | 34.5 |
| Per cent Set | 4.1 | 4.8 | 7.8 | 8.9 |
| De Mattia Flex. (Ave. of 3 cut specimens), 75′ @ 307° F | 708,519 | 516,089 | 677,006 | >1,000,000 |

EXAMPLE 6

Purified, redistilled tertiary octyl mercaptan was similarly diluted with hydrocarbon diluent and similar determinations were made on an isobutylene-isoprene copolymer as in Example 2 to yield the inspection record shown in the attached Table V:

*Table V*

| Stock No. | 1 | 2 | 3 | 4 |
|---|---|---|---|---|
| Polymer | 100 | 100 | 100 | 100 |
| Distilled t-Octyl Mercaptan, 3.88 pts | | 0.4 | 0.8 | 1.2 |
| Hydrocarbon diluent, 16.12 pts | | | | |
| Mooney Viscosity @ 212° F.: | | | | |
| 1½′ | 74 | 62 | 46 | 44 |
| 4′ | 68 | 58 | 45 | 40 |
| Tensile—Modulus @ 300%—Elongation: | | | | |
| 10′ @ 307° F | 2580-260-860 | 2340-240-890 | 1900-220-860 | 1330-210-760 |
| 20′ | 2850-390-850 | 2790-370-850 | 2520-300-880 | 2170-310-790 |
| 40′ | 2730-510-720 | 2870-500-790 | 2760-540-790 | 2780-500-780 |
| 60′ | 2740-600-740 | 2770-570-740 | 2710-560-760 | 2740-530-750 |
| 80′ | 2820-630-730 | 2860-610-750 | 2720-630-710 | 2780-600-750 |
| Rebound @ 40°–100° C., 75′ @ 307° F | 41.1-58.6 | 41.1-57.8 | 41.1-57.1 | 39.8-54.8 |
| Goodrich Flexometer (0.125″ stroke, 148 lbs./sq. in., 40° C.) 75′ @ 307° F.: | | | | |
| Shore | 52 | 49 | 49 | 49 |
| Static Compression | 0.276 | 0.315 | 0.295 | 0.284 |
| Initial Dyn. Comp | 0.251 | 0.266 | 0.267 | 0.271 |
| Dynamic Drift | 0.056 | 0.036 | 0.076 | 0.079 |
| Temperature Rise | 28.5 | 26.2 | 30.5 | 33.0 |
| Per cent Set | 4.1 | 4.2 | 6.6 | 8.8 |
| De Mattia Flex. (Ave. of 3 cut specimens) 75′ @ 307° F | 708,519 | 608,001 | >1,000,000 | >1,000,000 |

These results may be summarized in the following Table VI:

*Table VI*

| Mercaptan | Concentration of Mercaptan | Grams/100 g. of Polymer for 28 Mooney pts. reduction | Moles/100 g. Polymer for 28 Mooney pts. reduction |
|---|---|---|---|
| Triisobutyl SH | Undiluted | 0.352 | 0.00176 |
| Triisobutyl SH | 25.2% | 0.172 | 0.00086 |
| Diisobutyl SH | Undiluted | 0.455 | 0.00316 |
| Diisobutyl SH | 19.4% | 0.206 | 0.00143 |
| Lauryl SH | Undiluted | 0.525 | 0.00228 |
| Lauryl SH | 20% | 0.240 | 0.00104 |
| t-Octyl SH | 19.4% | 0.185 | 0.00128 |
| t-Octyl SH (crude) | 19.4% | 0.240 | 0.00167 |

The number of carbon atoms in the mercaptan is not significant with respect to the utility of this reaction. The very low carbon number mercaptans are less desirable because of their low boiling points, but there is no upper limit on the carbon atom number in the mercaptan molecule. The $C_{16}$ and $C_{18}$ compounds such as may be obtained from alcohols prepared by the hydrogenation of tallow and similar fats and oils are just as effective as the lower carbon number mercaptans of the above examples. Accordingly, all of the mercaptans of any molecular weight are usable in greater or less degree, but in view of the unpleasant odor of the lower molecular weight mercaptans, the higher mercaptans are preferred for plant use since they are much less objectionable to the operators.

The above examples show the use of the monomercaptans. Other determinations, however, indicate that the poly-mercaptans are equally useful, and present information indicates that there is no molecular weight limit on any of the aliphatic poly-mercaptans, either in the carbon atom number or the sulfur atom number; and that all are efficiently operative for purposes of the present invention.

The above examples show as the material to be plasticized, only the low temperature synthetic polymer of isobutylene with a multi olefin. The invention is not, however, limited to such materials, but is applicable also to all of the other synthetic rubber-like polymers including the emulsion interpolymer of butadiene with styrene, and the emulsion interpolymer of butadiene with acrylonitrile.

EXAMPLE 7

A polymer was prepared by mixing together approximately 24 parts of styrene with approximately 76 parts of butadiene; and the mixture emulsified in a water solution containing approximately 1% of soap and approximately 1% of a peroxide catalyst. In this instance, sodium perborate was used, although hydrogen peroxide, sodium persulfate and the like would have been equally satisfactory. The hydrocarbons were maintained in emulsion form in the water solution by vigorous stirring and the material was held at a temperature of approximately 45° C., with continuous stirring for a time interval of approximately 20 hours. At the end of this time interval, the emulsion was released from pressure and the residual unpolymerized butadiene flashed off. The emulsion was then steam distilled to remove as much as possible of the unreacted styrene and the emulsion was then coagulated by the addition thereto of an approximately equal amount of a saturated brine. The coagulate was separated and then milled under a stream of clear water to remove as much as possible of the soap and catalyst and to drive out as much as possible of the butadiene and styrene retained in the polymer.

A series of 8 samples were then treated with varying amounts of lauryl mercaptan as shown in the following table:

*Table I*

| Sample No. | Treatment |
|---|---|
| 1 | Buna S[1] plus 10 wt. Per cent Lauryl Mercaptan (10′ milling) |
| 2 | Buna S[1] plus 5 wt. Per cent Lauryl Mercaptan (10′ milling) |
| 3 | Buna S[1] plus 5 wt. Per cent Octyl Mercaptan (10′ milling) |
| 4 | Buna S[1] plus 3½ wt. Per cent Amyl Mercaptan (10′ milling) |
| 5 | Buna S[1] plus 2½ wt. Per cent Plant Mercaptan[2] (10′ milling) |
| 6 | Buna S[1]—control (10′ milling) |
| 7 | Buna S[1]—control |
| 8 | Buna S[1] plus 5 wt. Per cent Cetyl Mercaptan (10′ milling) |

[1] The emulsion copolymer of butadiene and styrene.
[2] Mercaptans from plant streams (from a petroleum factory).

After the application of the various treatments shown in the above table, Mooney viscosity determinations were made of several treated polymers and the results shown in the subjoined Table 2 were obtained:

Table II
[Mooney viscosity at 212° F. Large rotor.]

|  | #1 | #2 | #3 | #4 | #5 | #6 | #7 | #8 |
|---|---|---|---|---|---|---|---|---|
| ½′ | 22 | 37 | 53 | 45 | 46 | 46 | 52 | 48 |
| 1′ | 21 | 37 | 53 | 45 | 46 | 46 | 51 | 49 |
| 1½′ | 21 | 37 | 53 | 46 | 46 | 45 | 52 | 48 |
| 2′ | 21 | 38 | 52 | 46 | 46 | 43 | 54 | 49 |
| 2½′ | 21 | 38 | 52 | 47 | 45 | 41 | 54 | 50 |
| 3′ | 21 | 38 | 48 | 47 | 44 | 40 | 56 | 50 |
| 3½′ | 21 | 38 | 46 | 49 | 42 | 39 | 58 | 50 |
| 4′ | 22 | 38 | 45 | 49 | 41 | 38 | 57 | 49 |
| 4½′ | 22 | 37 | 48 | 49 | 40 | 37 | 57 | 49 |
| 5′ | 22 | 37 | 46 | 48 | 39 | 36 | 57 | 49 |

Williams plasticity and recovery values were likewise obtained for the same samples, according to Table III.

Table III

78–13  106–22  132–181  111–36  134–167
        123–41  129–151  126–154

Each of the 8 samples was then compounded according to the following recipe and four portions of each sample were then taken and cured respectively for 15 minutes, 30 minutes, 60 minutes and 120 minutes. Determinations were then made on each of the cured specimens for tensile strength, elongation at break and modulus at 300% elongation, yielding the results shown in the subjoined Table IV.

|  | Parts by weight |
|---|---|
| Polymer | 100 |
| Zinc oxide | 5 |
| Stearic acid | 2.5 |
| Carbon black (Cabot #9) | 50 |
| Sulfur | 1.5 |
| Tetramethyl thiuram monosulfide | 0.4 |
| Coal tar distillate | 5 |

Table IV

Tensile—Elongation (microtensile)—Mod. at 300%:

| 15′ at 287° | 1350–770 360 | 2110–730 570 | 2700–710 735 | 2940–790 695 | 1730–875 375 | 785–770 245 | 1030–760 265 | 2410–800 605 |
| 30′ | 1635–780 430 | 2570–730 655 | 2740–630 890 | 2950–695 865 | 2960–840 615 | 2480–890 475 | 2490–826 480 | 2720–745 690 |
| 60′ | 1730–750 445 | 2515–690 680 | 2510–620 825 | 2970–700 815 | 3190–795 705 | 2400–765 575 | 2670–790 580 | 2580–745 665 |
| 120′ | 1390–650 460 | 2240–660 750 | 3020–680 890 | 2580–650 795 | 2890–725 775 | 2460–760 605 | 2520–730 570 | 1970–710 580 |

These results show the efficacy of the mercaptans as softeners and viscosity improvers when applied to the emulsion copolymer of butadiene and styrene.

EXAMPLE 8

Similar results are obtained with the copolymer of butadiene and acrylonitrile.

A polymer was prepared by mixing together approximately 74 parts of butadiene with 26 parts of acrylonitrile and this mixture was emulsified in a water solution containing approximately 1% of soap and approximately 1% of sodium perborate catalyst. The hydrocarbon mixture was maintained in an emulsion by a vigorous stirring which was continued for a period of approximately 16 hours at a temperature of approximately 45° C. At the end of this time interval, the pressure was released and the residual, unreacted butadiene was flashed out. The emulsion was then steam-distilled to remove a small amount of residual, unpolymerized acrylonitrile and the mixture was then acidified to coagulate and precipitate the polymer from the emulsion. The precipitated polymer was then separated and milled under a stream of clear water to remove as much as possible of the soap, catalyst, and residual traces of unreacted butadiene and styrene.

The resulting polymer was divided into two portions, one of which was milled for 10 minutes with 5% by weight of lauryl mercaptan, the other of which was simpy milled for ten minutes; the sample milled with the mercaptan being identified as item 9 and the one without the mercaptan being identified as item 10. Mooney viscosity determinations were then made of these two polymers to yield the following results:

[At 212° F.]

|  | #237–89–9 | #237–89–10 |
|---|---|---|
| ½′ | 68 | 89 |
| 1′ | 66 | 85 |
| 1½′ | 64 | 81 |
| 2′ | 62 | 77 |
| 2½′ | 60 | 75 |
| 3′ | 58 | 74 |
| 3½′ | 57 | 72 |
| 4′ | 56 | 70 |
| 4½′ | 55 | 69 |
| 5′ | 54 | 68 |

Williams plasticity and recovery determinations made on the same samples yielded the following data:

[At 80° C.]

115–84   133–172

The respective portions were then compounded according to the following recipe:

| Recipe | 1 | 2 | 3 | 4 | 5 |
|---|---|---|---|---|---|
| Item 9 | 100 |  | 100 | 100 | 100 |
| Item 10 |  | 100 |  |  |  |
| Zinc Oxide | 5 | 5 | 5 | 5 | 5 |
| Stearic Acid | 1.5 | 1.5 | 1.5 | 1.5 | 1.5 |
| Easy Processing Channel Black | 50 | 50 | 50 | 50 | 50 |
| Tetramethyl thiuram monosulfide | 0.4 | 0.4 | 0.4 | 0.4 | 0.4 |
| Dibutyl Phthalate | 10 | 10 | 10 | 10 | 10 |
| Sulfur | 1.5 | 1.5 | 1.7 | 1.9 | 2.1 |

Four samples were then taken from the compounded portions and cured respectively for 15 minutes, 30 minutes, 60 minutes and 120 minutes at 287° F.

Determinations were then made of the tensile strength, modulus at 300% and elongation at break on the respective samples to yield the following table of results:

Tensile—Mod. at 300%—Elongation (microtensiles):

| 15′ at 287° F | 1965–505 630 | 2670–590 660 | 2500–515 690 | 2110–530 660 | 2570–624 620 |
| 30′ | 2560–565 650 | 3440–780 640 | 2800–555 680 | 2300–665 590 | 2680–610 610 |
| 60′ | 2570–640 590 | 3380–875 590 | 2850–715 610 | 2660–695 610 | 2780–720 596 |
| 120′ | 2370–610 580 | 3285–810 590 | 2690–630 610 | 2740–660 610 | 2790–760 560 |

These results similarly show the effectiveness of the mercaptans for synthetic rubber-like polymers generally.

It may be noted that in Examples 7 and 8, quantities of mercaptans as high as 10% are indicated. These, however, are too high for most purposes and are given for comparison only. Usually not more than 1% of mercaptan is needed for the plasticization, the milling being continued with this amount until the desired softness is obtained.

Thus the process of the invention adjusts the Mooney viscosity value of a synthetic rubber-like polymer by milling the polymer with small amounts of an aliphatic mercaptan.

While there are disclosed above but a limited number of embodiments, it is possible to provide still other embodiments without departure from the inventive concept herein disclosed, and it is, therefore, desired that only such limitations be imposed upon the appended claims as are stated therein or required by the prior art.

The invention claimed is:

1. A composition of matter comprising a predominantly linear chain polymer of a major proportion of isobutylene with a minor proportion of butadiene having a molecular weight between 25,000 and 200,000 and an iodine number within the range between 1 and 50, milled at a temperature between 200 and 350° F. together with an alkyl mercaptan having a boiling point within the range between 200° F. and 350° F. in a proportion within the range between 0.1% and 1%.

2. A composition of matter comprising a predominantly linear chain polymer of a major proportion of isobutylene with a minor proportion of dimethyl butadiene having a molecular weight between 25,000 and 200,000 and an iodine number within the range between 1 and 50, milled at a temperature between 200 and 350° F. together with an alkyl mercaptan having a boiling point within the range between 200° F. and 350° F. in a proportion within the range between 0.1% and 1%.

3. In the processing of a predominantly linear chain polymer prepared from a major proportion of isobutylene and a minor proportion of a $C_4$—$C_6$ conjugated diolefin having a molecular weight in the range between 25,000 and 200,000 and a high viscosity, the steps of adding to the polymer 0.1 to 1% of a $C_8$ to $C_{12}$ alkyl mercaptan and milling the polymer in the presence of the added mercaptan at a temperature between 200° F. and 350° F. to reduce the viscosity of the polymer.

4. A process as defined in claim 3 wherein the mercaptan is isododecyl mercaptan.

5. A process according to claim 3 wherein the conjugated diolefin is isoprene and the mercaptan is isododecyl mercaptan.

6. A process according to claim 3 wherein the mercaptan is added as isododecyl mercaptan diluted with a hydrocarbon liquid having a boiling range between 325° F. and 375° F.

7. A composition of matter comprising a predominantly linear chain polymer prepared from a major proportion of isobutylene and a minor proportion of a $C_4$—$C_6$ conjugated diolefin having a molecular weight within the range between 25,000 and 200,000 and an iodine number within the range betwen 1 and 50, milled together at a temperature between 200° F. and 350° F. with 0.1 to 1.0% of a $C_8$ to $C_{12}$ alkyl mercaptan, the composition having an adjusted Mooney viscosity within the range between 35 and 60.

8. A composition of matter as defined in claim 7 wherein the conjugated diolefin is isoprene and the iodine number of the polymer is within the range between 1 and 10.

9. A composition of matter as defined in claim 7 wherein the conjugated diolefin is isoprene, the mercaptan is isododecyl mercaptan and the iodine number of the polymer is within the range between 1 and 10.

10. In the processing of a synthetic polymer of a major proportion of isobutylene with a minor proportion of a monomeric polyolefin having 4 to 14 inclusive, carbon atoms per molecule, the step of milling the polymer at a temperature between 200 and 350° F. with an alkyl mercaptan, comprising 0.1% to 1% of the polymer of iso-octyl mercaptan.

11. In the processing of a synthetic polymer of a major proportion of isobutylene with a minor proportion of a monomeric polyolefin having 4 to 14, inclusive, carbon atoms per molecule, the step of milling the polymer at a temperature between 200 and 350° F. with an alkyl mercaptan, comprising 0.1% to 1% of the polymer of lauryl mercaptan.

PER K. FROLICH.

REFERENCES CITED

The following references are of record in the file of this patent:

UNITED STATES PATENTS

| Number | Name | Date |
|---|---|---|
| 2,098,542 | Charch | Nov. 9, 1937 |
| 2,234,204 | Starkweather | Mar. 11, 1941 |
| 2,316,949 | Garvey | Apr. 20, 1943 |
| 2,384,070 | Bolton | Sept. 4, 1945 |
| 2,415,449 | Sverdrup | Feb. 11, 1947 |

FOREIGN PATENTS

| Number | Country | Date |
|---|---|---|
| 112,284 | Australia | Jan. 16, 1941 |
| 520,505 | Great Britain | Apr. 25, 1940 |
| 542,645 | Great Britain | Jan. 21, 1942 |